(12) United States Patent
Aoyama (10) Patent No.: US 9,955,069 B2
(45) Date of Patent: Apr. 24, 2018

(54) CONTROL APPARATUS, STORAGE MEDIUM FOR STORING CONTROL PROGRAM, CONTROL METHOD, AND OPTICAL APPARATUS

(71) Applicant: CANON KABUSHIKI KAISHA, Tokyo (JP)

(72) Inventor: Yuuzou Aoyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 210 days.

(21) Appl. No.: 15/093,217

(22) Filed: Apr. 7, 2016

(65) Prior Publication Data

US 2016/0301858 A1 Oct. 13, 2016

(30) Foreign Application Priority Data

Apr. 8, 2015 (JP) .................. 2015-079234

(51) Int. Cl.
*H04N 5/232* (2006.01)
*H04N 5/14* (2006.01)
*G02B 7/14* (2006.01)

(52) U.S. Cl.
CPC ......... *H04N 5/23222* (2013.01); *H04N 5/145* (2013.01); *H04N 5/23209* (2013.01); *H04N 5/23261* (2013.01); *G02B 7/14* (2013.01); *H04N 5/23258* (2013.01); *H04N 5/23287* (2013.01)

(58) Field of Classification Search
CPC .................................................. H04N 5/23222
USPC .......................................................... 348/169
See application file for complete search history.

(56) References Cited

U.S. PATENT DOCUMENTS 5,982,421 A * 11/1999 Inou .................. H04N 5/23248
348/208.5
2005/0280733 A1* 12/2005 Imaizumi ........... H04N 5/23212
348/345

FOREIGN PATENT DOCUMENTS

JP  2006-317848 A  11/2006

* cited by examiner

*Primary Examiner* — Yulin Sun
(74) *Attorney, Agent, or Firm* — Cowan, Liebowitz & Latman, P.C.

(57) ABSTRACT

A control apparatus includes a calculation unit configured to calculate a driving amount of the optical element from a motion vector detected in an object area that contains an image of the object in a motion image generated by capturing, and a control unit configured to control the optical element according to the driving amount. The calculation unit calculates the driving amount for each of a plurality of motion vectors having different magnitudes detected in a plurality of object areas in the motion image. The control unit controls the optical element for each of the plurality of calculated driving amounts and for each capturing of a plurality of still images.

8 Claims, 9 Drawing Sheets

CONTROL APPARATUS, STORAGE MEDIUM FOR STORING CONTROL PROGRAM, CONTROL METHOD, AND OPTICAL APPARATUS

BACKGROUND OF THE INVENTION

Field of the Invention

The present invention relates to a technology of controlling a so-called follow shot assisting function in an optical system.

Description of the Related Art

A follow shot is a capturing technique to express a sense of speed of a moving object through a flowing background, where a user pans an image pickup apparatus (referred to as a "camera" hereinafter) in synchronization with a movement of an object so that the moving object can stand still in the captured image. In addition, there is known a camera having a follow shot assisting function that provides a good follow shot even when a panning velocity changes by detecting a motion (vector) of an object in a captured image, and by shifting a shift lens in an image pickup optical system relative to the optical axis so as to reduce the movement of the object.

Japanese Patent Laid-Open No. ("JP") 2006-317848 discloses a follow shot assisting method for calculating a lens shift amount necessary to position an object at a center in an image based on a detection result of vibrations of a camera using a vibration detector and a motion vector of the object in a captured image, and to shift the shift lens relative to the optical axis by the shift amount. The motion vector of the object is detected in a predetermined object area.

However, as disclosed in JP 2006-317848, the method for shifting the shift lens using the motion vector detected based on the captured image has the following disadvantages. When there are pluralities of object images in the captured image and each motion vector is detected, the shift lens may be controlled according to the motion vector of an object different from the main object to be captured or to be stopped by the user. Then, the main object is not made stationary in the captured image or is deviates from the captured image.

SUMMARY OF THE INVENTION

The present invention provides a control apparatus, a storage medium, a control method, and an optical apparatus, which can obtain a captured image of a main object by a good follow shot even when there are pluralities of objects including the main object.

A control apparatus according to the present invention is configured to control an optical element configured to move in a direction different from an optical axis of an image pickup optical system in capturing an object that moving. The control apparatus includes a calculation unit configured to calculate a driving amount of the optical element from a motion vector detected in an object area that contains an image of the object in a motion image generated by capturing, and a control unit configured to control the optical element according to the driving amount. The calculation unit calculates the driving amount for each of a plurality of motion vectors having different magnitudes detected in a plurality of object areas in the motion image. The control unit controls the optical element for each of the plurality of calculated driving amounts and for each capturing of a plurality of still images. At least one processor or circuit is configured to perform a function of at least one of the units.

Further features of the present invention will become apparent from the following description of exemplary embodiments with reference to the attached drawings.

DESCRIPTION OF THE EMBODIMENTS

A description will now be given of embodiments according to the present invention with reference to the accompanying drawings.

First Embodiment

Figure 1:
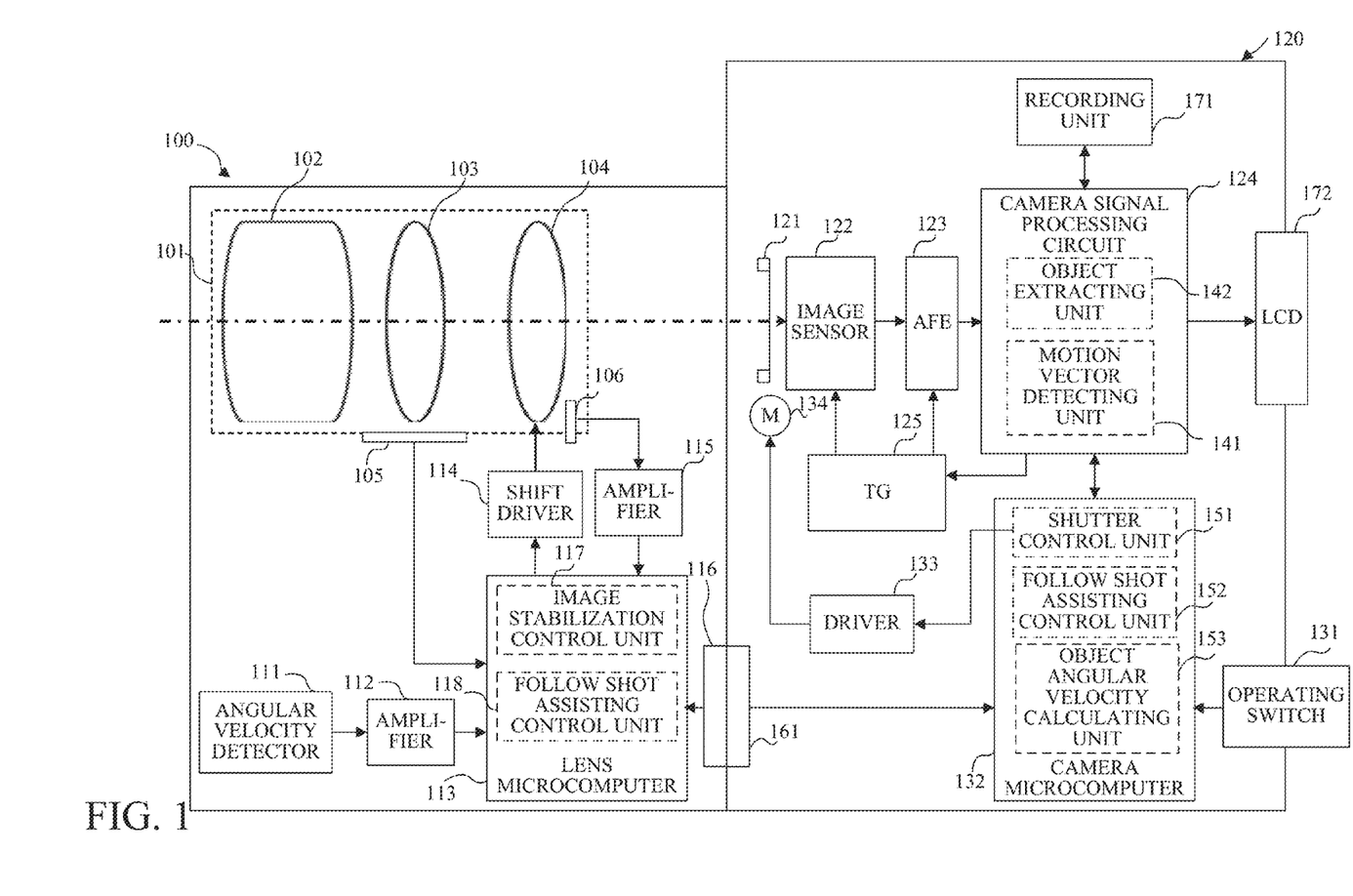
FIG. 1 is a block diagram of a configuration of an image pickup apparatus according to a first embodiment of the present invention.

FIG. 1 is a structure of an image pickup apparatus as an optical apparatus according to a first embodiment of the present invention. In FIG. 1, reference numeral 100 denotes an interchangeable lens, reference numeral 120 denotes an image pickup apparatus (which will be referred to as a "camera" hereinafter) to which the interchangeable lens 100 is detachably attached.

The interchangeable lens 100 has an image pickup optical system 101. The image pickup optical system 101 includes a main optical system 102, and a magnification varying lens unit 103 movable in the optical axis direction in which an optical axis of the image pickup optical system 101 extends and configured to change a focal length of the image pickup optical system 101. The image pickup optical system 101 includes a shift lens unit 104 as a shift device (optical element) that is movable (shiftable) in the direction orthogonal to the optical axis.

The shift lens unit 104 is shifted so as to optically correct (or reduce) a blur of an image caused by a vibration of the camera 120 (referred to as a "camera vibration" hereinafter) by manual vibrations. This shift will be referred to as image stabilization driving. In addition, the shift lens unit 104 is shifted so as to assist a follow shot of a moving object when the camera 120 is panned by the user. This shift will be referred to as "follow shot assist driving." Control of the follow shot assist driving will be described later.

The interchangeable lens 100 includes a zoom encoder 105 configured to detect a position of the magnification varying lens unit 103, a shift driver 114 configured to shift the shift lens unit 104, and a shift position detector 106 configured to detect a (shift) position in the shift direction of the shift lens unit 104. The shift driver 114 includes an actuator, such as a voice coil motor, and a driver circuit configured to drive the actuator.

The interchangeable lens 100 has an angular velocity detector 111 as a motion detecting unit configured to detect an angular velocity of the moving camera 120 by manual vibrations and/or panning. An output of the angular velocity detector 111 is amplified by an amplifier 112 and input into a lens microcomputer 113. An output of the shift position detector 106 is amplified by the amplifier 115 and input into the lens microcomputer 113.

The lens microcomputer 113 controls the shift driver 114 based on the angular velocity detected by the angular velocity detector 111 and the shift position detected by the output from the shift position detector 106, and thereby controls the stabilization driving of the shift lens unit 104. In addition, the lens microcomputer 113 receives information of a shift direction and a shift driving amount of the shift lens unit 104, which will be referred to as "shift control information" hereinafter, from a camera microcomputer 132, which will be described later. Then, the lens microcomputer 113 controls the shift driver 114 based on the shift control information and the shift position detected based on the output from the shift position detector 106, and thereby controls the follow shot assist driving of the shift lens unit 104.

The shift lens unit 104 is actually shifted in two shift directions that are orthogonal to each other, such as a horizontal (yaw) direction and a vertical (pitch) direction, and the angular velocity detector 111 and the shift driver 114 are provided for each shift direction. Since the angular velocity detectors 111 and the shift drivers 114 for respective direction have the same structures, FIG. 1 illustrates the angular velocity detector 111 and the shift driver 114 only in one shift direction.

The lens microcomputer 113 includes an image stabilization control unit 117 configured to control the image stabilization control, and a follow shot assist control unit 118 configured to control the follow shot assist driving. In addition, the lens microcomputer 113 controls driving of the unillustrated focus lens and the diaphragm included in the image pickup optical system 101.

The interchangeable lens 100 has a lens mount bayonet-connected to the camera 120, and the lens mount has a mount contact section 116.

The camera 120 includes a shutter 121 and an image sensor 122, such as a CMOS sensor. The image sensor 122 photoelectrically converts (captures) an object image formed by the image pickup optical system 101. The shutter 121 controls an exposure amount of the image sensor 122. The camera 120 includes an analog signal processing circuit 123, a camera signal processing circuit 124, a timing generator (TG) 125 configured to set operational timings of the image sensor 122 and the analogue signal processing circuit 123. The analogue signal processing circuit 123 converts an analogue signal output from the image sensor 122 into a digital signal, and generates a captured image, such as a motion image and a still image, by performing various signal processing to the digital signal. The image sensor 122 and the analogue signal processing circuit 123 form an image pickup unit configured to generate an image by capturing the object.

The camera 120 includes an operating switch 131, such as a power switch, a release switch (image pickup preparation or recording) and a variety of image pickup mode setting switch, and a camera microcomputer 132 configured to control an entire operation of the camera 120. The camera 120 includes a shutter motor 134 configured to charge the shutter 121, and a shutter driver 133 configured to drive the shutter.

The camera 120 includes a recording unit 171 configured to record a captured image to be recorded, into a recording medium, such as a semiconductor memory and an optical disk, and a display unit 172 (referred to as an "LCD" hereinafter), such as a liquid crystal panel configured to display a captured image containing a live-view image as a motion image that is not recorded.

The camera 120 has a camera mount to be bayonet-connected by the interchangeable lens 100, which will be described above, and the camera mount has a mount contact section 161 electrically connected to the mount contact section 116 of the lens mount. The camera microcomputer 132 and the lens microcomputer 113 communicate with each other via the mount contact sections 161 and 116 (for example, serial communications), and the camera 120 supplies power to the interchangeable lens 100.

The camera signal processing circuit 124 has an object extracting unit 142 and a motion vector detecting unit 141 (detecting unit). The object extracting unit 142 extracts an object area as an image area containing an image of the object from the live view image. The motion vector detecting unit 141 detects a motion vector in the object area.

The camera microcomputer 132 includes a shutter control unit 151 configured to control the shutter 121 through the shutter driver 133, a follow shot assisting control unit 152 configured to provide follow shot assisting continuous capturing processing described later, and an object angular velocity calculating unit 153 configured to calculate the angular velocity of the object.

In FIG. 1, when the power switch of the operating switch 131 is operated by the user and the camera 120 is powered on, the camera microcomputer 132 detects a state change. The power is supplied to each part in the camera 120 under control of the camera microcomputer 132, and each part is initially set. The power is supplied to the interchangeable lens 100, and the interchangeable lens 100 is initially set under control of the lens microcomputer 113. In this case, the communication between the camera microcomputer 132 and the lens microcomputer 113 starts. In this communication, information indicative of a state of the camera 120 and image pickup settings, such as setting/non-setting of the follow shot assisting mode, is sent from the camera microcomputer 132 to the lens microcomputer 113. In addition, the focal length and other optical information of the image pickup optical system 101 are sent from the lens microcomputer 113 to the camera microcomputer 132.

In the normal image pickup mode in which the follow shot assisting mode is not set, the lens microcomputer 113 controls the image stabilization driving of the shift lens unit 104 through the image stabilization control unit 117 based on the angular velocity detected by the angular velocity detector 111. On the other hand, in the follow shot assisting mode, the lens microcomputer 113 controls the follow shot assist driving of the shift lens unit 104 through the follow shot assisting control unit 118 according to the shift control information from the camera microcomputer 132 as described above.

Figure 2:
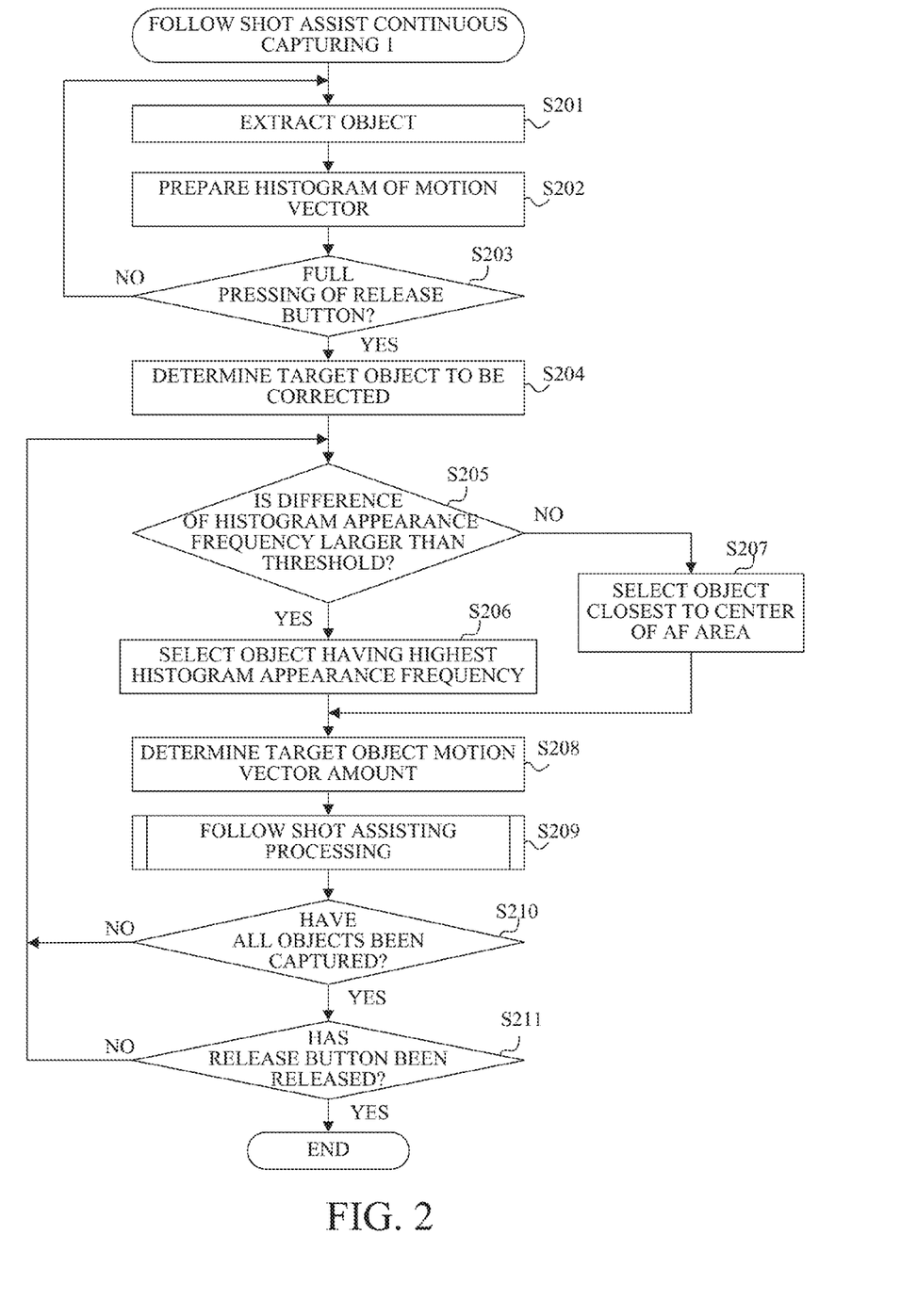
FIG. 2 is a flowchart of follow shot assisting continuous capturing processing in an image pickup apparatus according to the first embodiment.

A description will now be given of control of follow shot assist driving of the shift lens unit 104. A flowchart illustrated in FIG. 2 illustrates a flow of the follow shot assisting continuous capturing processing performed by the camera microcomputer 132. The camera microcomputer 132 that serves as an optical element control unit (or calculating unit) executes this processing according to a follow shot assisting continuous capturing processing program as a computer program including an optical element control program. This processing is still image capturing processing (continuous capturing) plural times using the follow shot assist processing, when the user takes a follow shot of a scene in which a plurality of objects containing a main object to be captured by the user move in the same directions at different velocities, while panning the camera 120. "S" in the flowchart stands for the step.

When the user half-presses the release switch in the operating switch 131 (image pickup preparation command), the camera microcomputer 132 makes the object extracting unit 142 extract an object area in the live-view image in S201. The object extracting unit 142 extracts the object area by a variety of methods, such as an object recognition and object tracking using a color detection and an edge detection. In response to the half-pressing operation, the camera microcomputer 132 performs image pickup preparation processing, such as autofocus for focusing on the object, photometry, settings of an aperture value and a shutter velocity.

Next, in S202, the camera microcomputer 132 makes the motion vector detecting unit 141 detect a plurality of motion vectors in the object area extracted by S201. The motion vector detecting unit 141 detects a motion vector, by a known method, such as block matching between frame images before and after the live-view image formed. The camera microcomputer 132 prepares a histogram of a plurality of detected motion vectors.

Figure 4A:
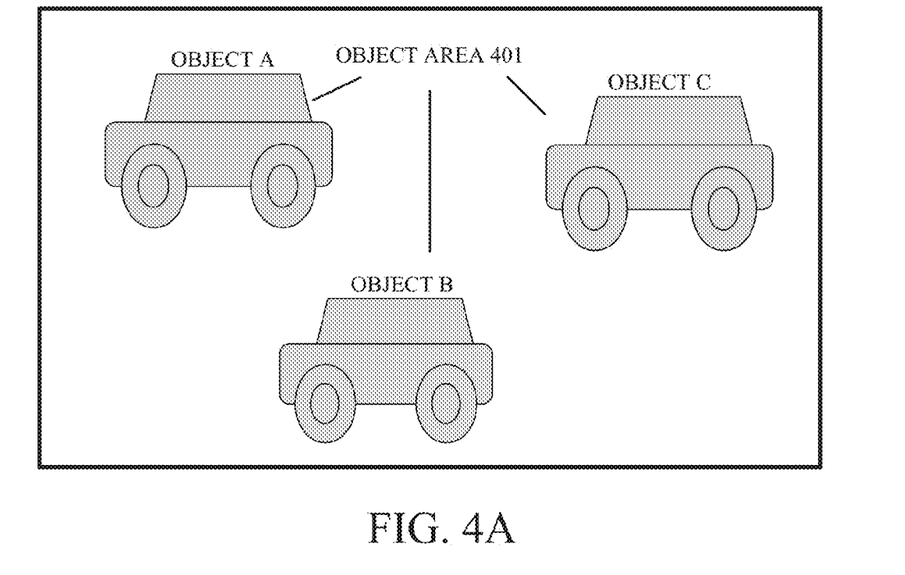
FIGS. 4A and 4B are views of a method for preparing a histogram of a motion vector according to the first embodiment.

FIG. 4A illustrates an object A, an object B, and an object C included in a plurality of (three) object areas 401 from the live-view image extracted by the object extracting unit 142 by S201. In the following description, the object areas 401 containing the objects A, B, and C will be referred to as object areas A, B, and C, respectively.

Figure 4B:
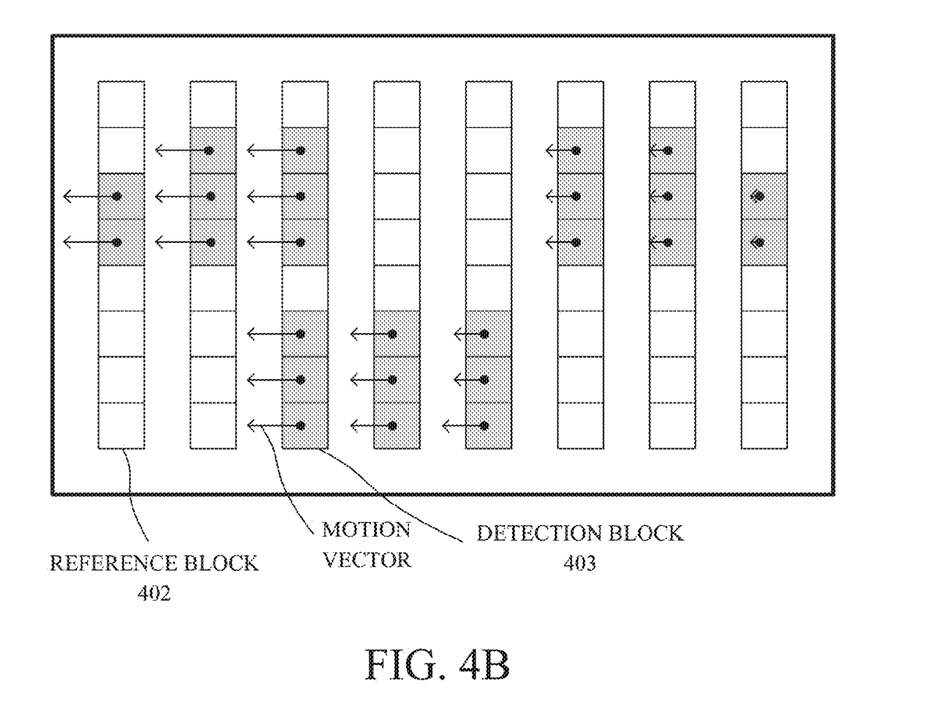

FIG. 4B illustrates reference blocks 402 as a plurality of small areas in which the motion vector detector 141 can detect a motion vector in the live-view image. This embodiment arranges 8 times 8 (=64) reference blocks 402 in the captured image. The motion vector detecting unit 141 detects a motion vector in a plurality of detection blocks 403 that overlap the object areas A, B, and C in these 64 reference blocks 402. An arrow that extends from each detection block 403 illustrates a direction and magnitude (velocity) of a motion vector detected by the detection block 403. Assume that this embodiment captures a scene in which the objects A, B, and C move in the same directions, and the motion vectors detected in all detection blocks 403 have the same directions but different magnitudes.

Figure 5:
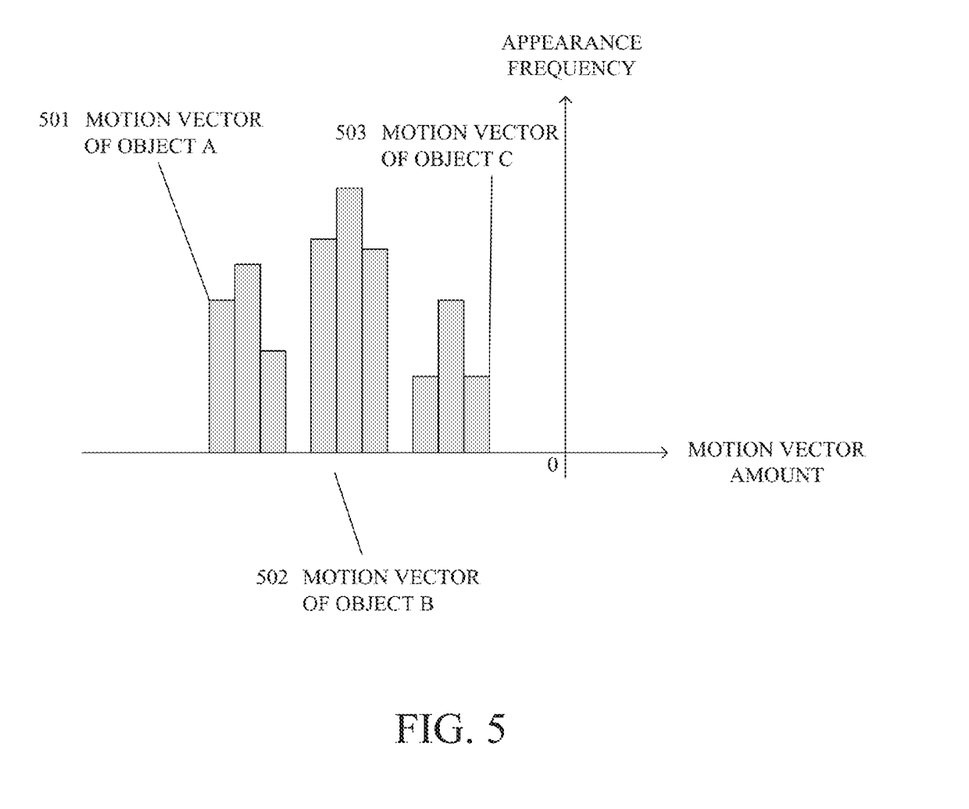
FIG. 5 is a view of a histogram of the above motion vector.

FIG. 5 illustrates a histogram indicative of an appearance frequency of a motion vector for each object area 401. Each bin in the histogram illustrates the appearance frequency (number) of the motion vector of the magnitude (amount) in the same or almost the same range. An abscissa axis denotes a motion vector amount, and an ordinate axis denotes an appearance frequency.

Reference numeral 501 denotes a histogram of the motion vectors for the object A (illustrated by three bins and so on). Reference numeral 502 denotes a histogram of the motion vectors for the object B. Reference numeral 503 denotes a histogram of the motion vectors for the object C. The motion vector amounts obtained by the object areas A, B, and C (positions in the abscissa axis direction of three bins) have large, intermediate, and small differences in this order. The appearance frequencies of the motion vectors obtained in the object areas A, B, and C have intermediate, large, and small differences in this order.

Next, in S203, the camera microcomputer 132 determines whether the user fully presses the release switch in the operating switch 131 (a capturing and recording command) in S203. When the release button is not fully pressed, the camera microcomputer 132 repeats the processing of S201 and S202. On the other hand, when the release button is fully pressed, the camera microcomputer 132 proceeds to S204 for capturing and recording processing.

In S204, the camera microcomputer 132 determines an object area (which will be referred to as a "target object area" hereinafter) that is a target of the motion vector correction processing among the object areas A, B, and C extracted in S201, based on the histogram prepared by S202. More specifically, initially the camera microcomputer 132 determines the target object area under a variety of conditions, such as an object area having a size equal to or larger than an area value or a certain ratio in the captured image, or an object area that overlaps or is close to a user selected focusing area (AF area). The following description assumes that a plurality of object areas A, B, and C has been determined as the target object areas in S204.

Next, in S205, the camera microcomputer 132 selects a first target object area that has a first priority in the follow shot assisting continuous capturing processing among the plurality of target object areas determined in S204. Thus, the camera microcomputer 132 compares the differences of the appearance frequency of the motion vector in the histogram in the plurality of target object areas with one another. In the appearance frequency compared herein, any one of the total value, the mode, and the average value of the appearance frequencies illustrated by three bins may be compared.

More specifically, when the difference of the appearance frequency of the motion vector among the plurality of target object areas exceeds a predetermined threshold, the camera microcomputer 132 moves to S206 so as to select the target object area having the highest appearance frequency of the motion vector as the first target object area. This is because when the appearance frequency of the motion vector in the object areas have a significant difference, the object area having the highest appearance frequency of the motion vector is more likely to represent the main object for the user. In the example of FIG. 5, the object area B is selected as the first target object area.

When the difference of the appearance frequency of the motion vector among the plurality of target object areas does not exceed a predetermined threshold, the camera microcomputer 132 moves to S207 so as to select the target object area closest to the center of the AF area as the first target object area. This is because it is difficult to determine the object area containing the main object based on the histogram and the object close to the center of the AF area is assumed to contain the main object. In the example of FIGS. 4A and 4B, the object area B is selected as the target object area.

Next, in S208, the camera microcomputer 132 calculates a motion vector amount to be corrected in the next step or the follow shot assist processing based on the histogram of the motion vector of the first target object area selected in S206 or S207. The motion vector amount to be corrected will be referred to as a "target motion vector amount" hereinafter. For example, the camera microcomputer 132 calculates, as a target motion vector amount, a motion vector amount having the highest frequency in the motion vector amounts illustrated by positions of three bins in the abscissa axis direction in each object area in the histogram illustrated in FIG. 5 or an average value of these motion vector amounts.

Next, in S209, the camera microcomputer 132 provides the follow shot assist processing using the target motion vector amount in the first target object area. Details of this follow shot assist processing will be described later.

Next, in S210, the camera microcomputer 132 determines whether the follow shot assisting ends for all target object areas. When the follow shot assisting for all target object areas is completed, the camera microcomputer 132 moves to S211. When the follow shot assisting for all target object areas has not yet been completed, the camera microcomputer 132 provides follow shot assist processing for the first target object area newly selected by repeating S205 to S209. Thus, among the motion vectors detected by the three object areas A, B, and C, shift driving is performed in order of a shift driving amount calculated for a motion vector having a higher appearance frequency.

In S211, the camera microcomputer 132 determines whether or not the release switch is released by the user. When it has not yet been released, the camera microcomputer 132 repeats S205 to S209, and performs the follow shot assist processing for the first target object area sequentially selected one each.

When the release switch is released in S211, the camera microcomputer 132 finishes this processing.

Figure 3:
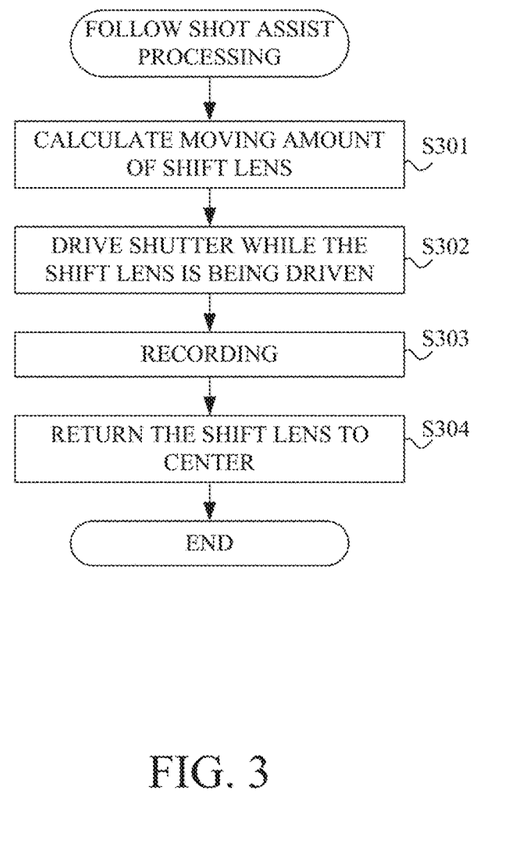
FIG. 3 is a flowchart for illustrating follow shot assist processing according to the first embodiment.

Next follows a description of the follow shot assist processing performed by the camera microcomputer 132 in S209, with reference to a flowchart in FIG. 3.

In S301, the camera microcomputer 132 calculates an angular velocity ω of the object on the image plane (or image pickup plane of the image sensor 122). The camera microcomputer 132 calculates a shift driving amount of the shift lens unit 104 so that the motion vector amount of the first target object area can become 0, using the calculated angular velocity a and the target motion vector amount of the first target object area calculated in S208.

Figure 6:
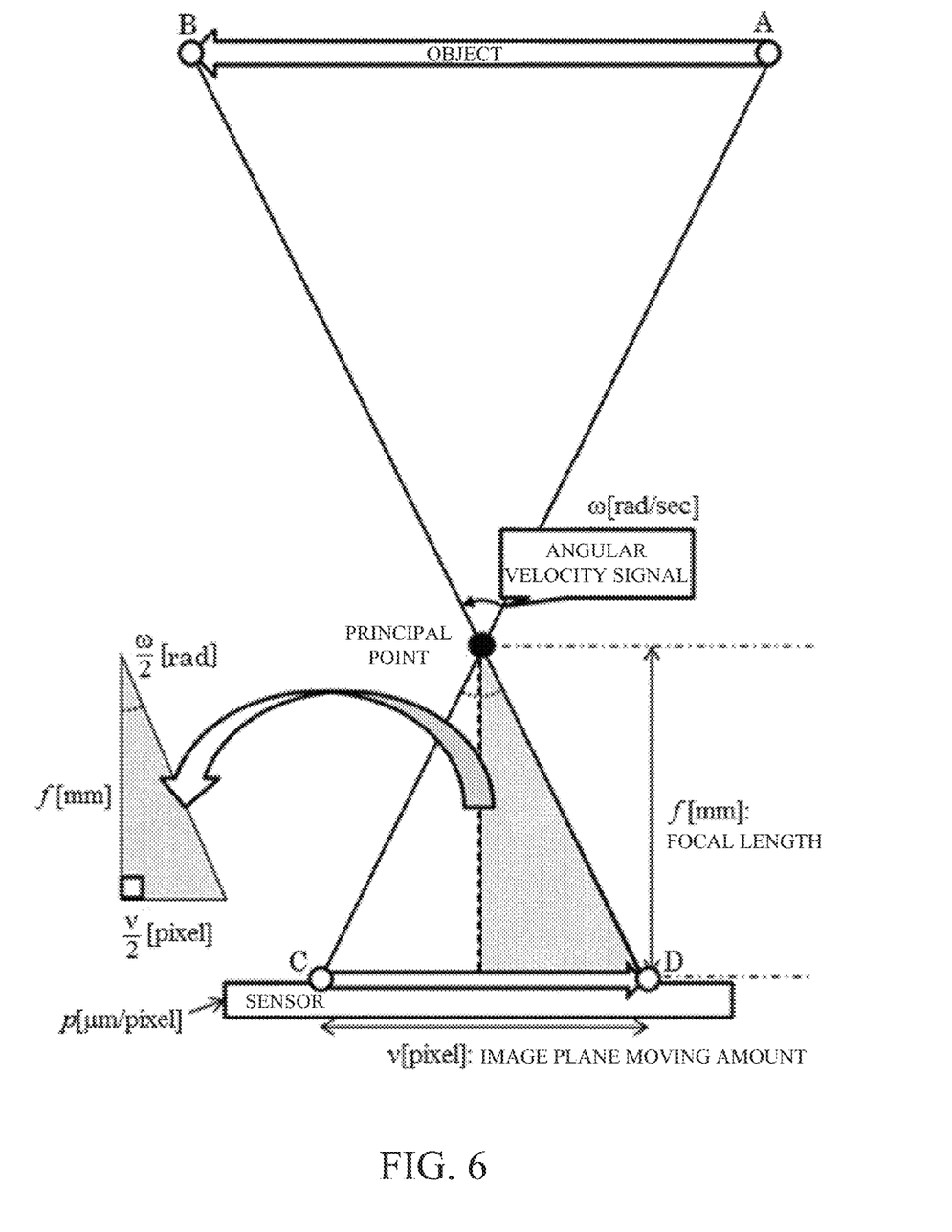
FIG. 6 is a calculating method of an angular velocity of an object according to the first embodiment.

Referring to FIG. 6, a description will be given of a calculating method of calculating the angular velocity of the object in this step. FIG. 6 is a view that illustrates that the main object moves from point A to point B for a "t" period, and that the main object image formed on the image plane of the image sensor 122 moves from point C to point D accordingly.

An angular speed ω [rad/sec] of the main object on the image plane is expressed as follows where υ [pixel] is a distance (image plane moving amount) from the point C to the point D, f [mm] is a focal length of the image pickup optical system 101, and p [μm/pixel] is a pixel pitch of the image sensor 122.

Expression 1

$$\tan\frac{\omega}{2}[\text{rad/sec}] = \frac{v}{2}[\text{pixel}] \times \frac{p}{1000}[\text{mm/pixel}] \div t[\text{sec}] \div f[\text{mm}] = \frac{vp}{2000\ tf} \quad (1)$$

$$\omega = 2\tan^{-1}\left(\frac{vp}{2000\ tf}\right) [\text{rad/sec}]$$

Next, in S302, the camera microcomputer 132 sends, to the lens microcomputer 113, a shift driving amount and a shift direction of the shift lens unit 104 (or shift control information) calculated in S301. In addition, the camera microcomputer 131 requires the lens microcomputer 113 for provide shift driving (or follow shot assist driving) of the shift lens unit 104. The camera microcomputer 132 opens the shutter 121 through the shutter driver 133, and thereafter closes the shutter 121 when the predetermined time period calculated by the photometric result elapses.

Next, in S303, the camera microcomputer 132 makes the camera signal processing circuit 124 generate a still image using an output from the image sensor 122, and the recording unit 171 record the still image in the recording medium. Thereby, in this still image, the object contained in the first target object area, such as the object B, stands still while the background containing other objects, such as the objects A and C, flows.

Next, in S304, the camera microcomputer 132 requires the lens microcomputer 113 to shift the shift lens unit 104 to the (center) position so that its optical axis accords with the optical axis of the image pickup optical system 101. Thereby, the shift lens unit 104 can fully shifted in any directions orthogonal to the optical axis on the image plane in the follow shot assist processing in the next still image capturing.

As described above, this embodiment detects the motion vector in each of the plurality of extracted object areas in the continuous capturing with follow shot assist processing. Then, this embodiment sequentially performs the follow shot assist processing using the motion vector detected in the object area for each object area. Thereby, pluralities of still images are generated under benefit of a follow shot assisting function for each object area in other words, when a user captures a scene using a follow shot assisting function, in which a plurality of objects containing the main object move at mutually different moving velocities, a still image can be surely obtained in which the main object receives an effect of proper follow shot assisting function.

Second Embodiment

A description will now be given of a second embodiment according to the present invention. Structures of the camera 120 and interchangeable lens 100 according to this embodiment are similar to those in the first embodiment, and those elements which are corresponding elements in the first embodiment will be designated by the same reference numerals as those of the first embodiment.

The first embodiment can surely acquire a captured image in which the main object has received an effect of the follow shot assist processing by repeating capturing each object area with the follow shot assist processing in which a different motion vector is detected in the follow shot assisting continuous capturing processing. However, when the angular velocity of camera 120 panned by the user may be too high or too low, the object that exists in the first captured image may not exist in the second or subsequent images. In this case, the captured image that contains the main object may not be obtained, when the disappeared object is the main object to be captured by the user.

Figure 8A:
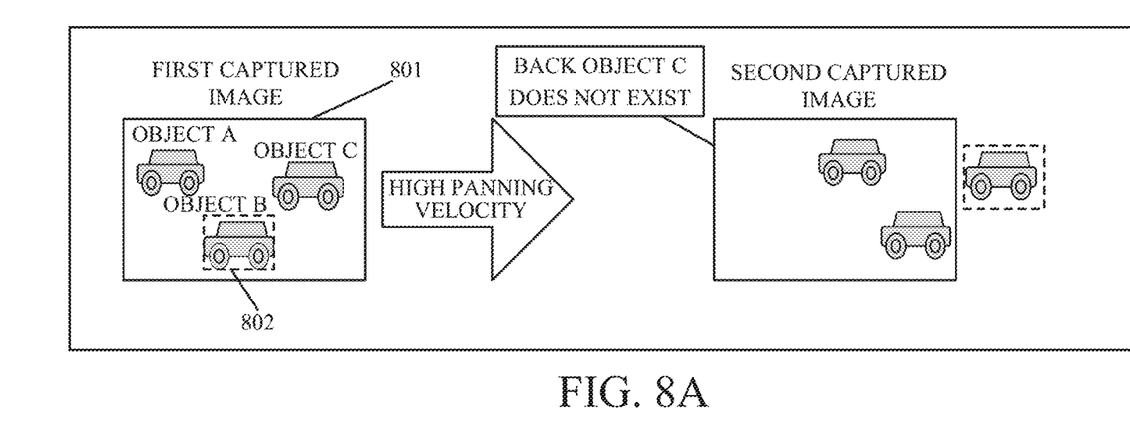
FIGS. 8A and 8E are views illustrating captured images obtained by the follow shot assisting continuous capturing processing according to the first embodiment.
Figure 8B:
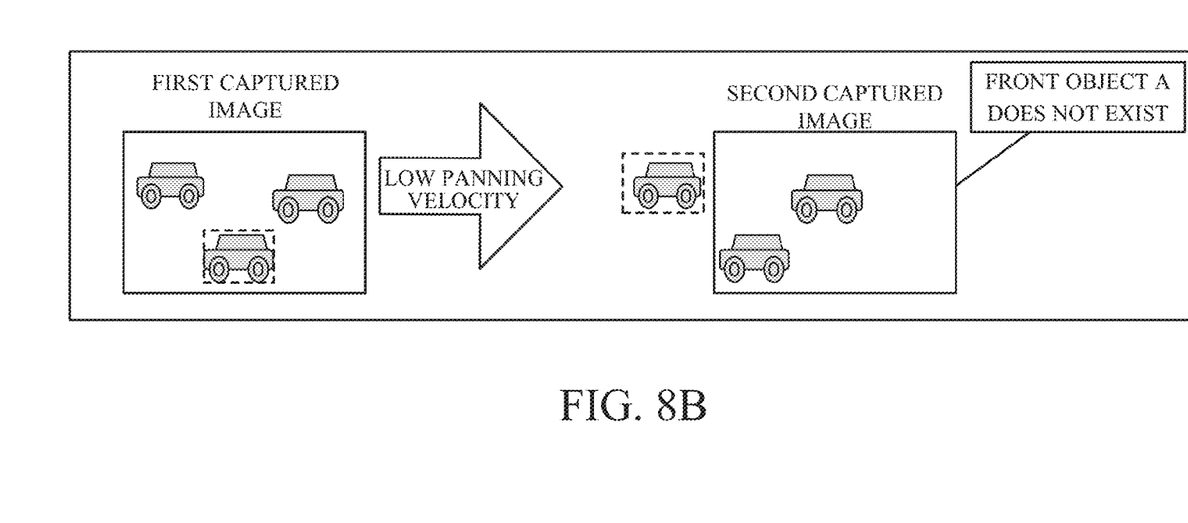

FIGS. 8A and 8B illustrate illustrative first and second captured (still) images taken by the follow shot assisting continuous capturing processing to the objects A, B, and C. A thick frame 801 in FIG. 8A indicates an outer edge of the first captured image. A dotted line 802 denotes an object image (first target object area) that is a target of the follow shot assist processing. The object area 802 contains the object B, and this object area 802 will be referred to as the object area B in the following description. This is applied to the object areas containing the objects A and C.

FIG. 8A illustrates that the first captured image is obtained by shifting the shift lens unit 104 so that the motion vector detected in the object area B can be 0. As illustrated in the second captured image in FIG. 8A, when the panning angular speed is high, the object area C that exists in the first captured image does not exist in the second captured image, and the second captured image that contains the object C cannot be obtained.

FIG. 8B illustrates that the first captured image is obtained by shifting the shift lens unit 104 so that the motion vector detected in the object area B can be 0. As illustrated in the second captured image in FIG. 8B, when the panning angular speed is low, the object area A that exists in the first captured image does not exist in the second captured image, and the second captured image that contains the object A cannot be obtained.

Thus, the camera according to the second embodiment of the present invention selects an object area that is a target of the follow shot assist processing according to positions of the plurality of object areas in the captured image and their moving velocities. When it is confirmed that all object areas are located within the captured image in (one-time consecutive) image pickup with the follow shot assist processing sequentially performed for all object areas, the object area to be processed is selected according to the histogram of the motion vector.

Figure 7:
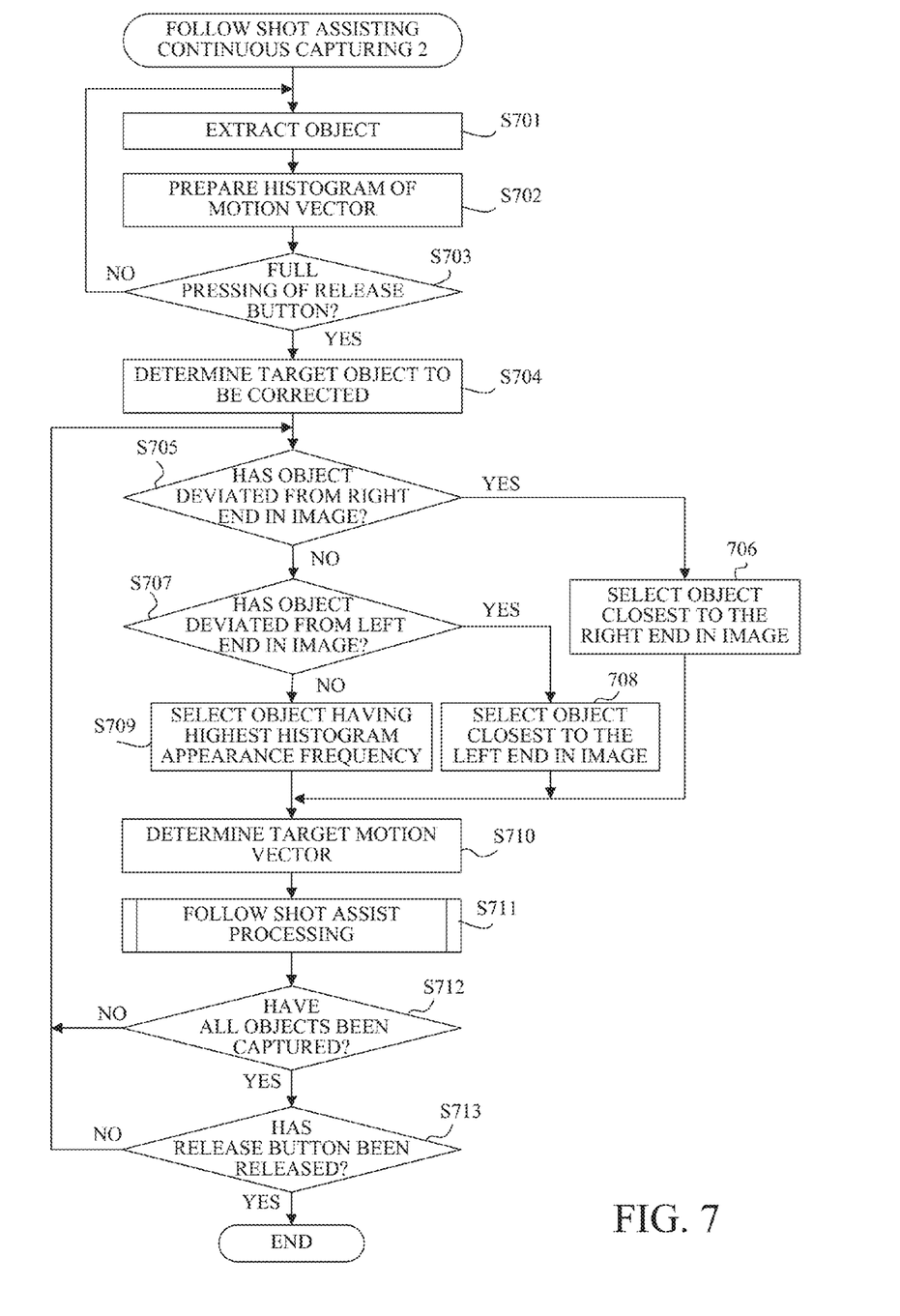
FIG. 7 is a flowchart illustrating follow shot assisting continuous capturing processing performed in an image pickup apparatus according to a second embodiment of the present invention.

The flowchart in FIG. 7 illustrates the flow of the follow shot assisting continuous capturing processing executed by the camera microcomputer 132. The camera microcomputer 132 executes this processing in accordance with the follow shot assisting continuous capturing processing program (containing the optical element control program) as a computer program. Similar to the first embodiment, this processing provides the follow shot assist processing and plurality of still image pickup captures (consecutive capturing) in the follow shot of a scene in which a plurality of objects containing the main object move in the same directions at different velocities.

When the user half-presses the release switch in the operating switch 131 an image pickup preparation command), the camera microcomputer 132 performs S701 to S704. S701 to S704 correspond to S201 to S204 in FIG. 2 according to the first embodiment.

Next, in S705, the camera microcomputer 132 determines whether or not any of the plurality of target object areas determined in S704 have deviated from the right end in the captured image before each one-time image pickup is completed for the objects A, B, and C or in the one-time continuous capturing. Hence, the camera microcomputer 132 detects the positions of the object areas A, B, and C in the captured image, and calculates a moving velocity of the object area based on the motion vector amounts detected in the object areas A, B, and C.

Figure 9A:
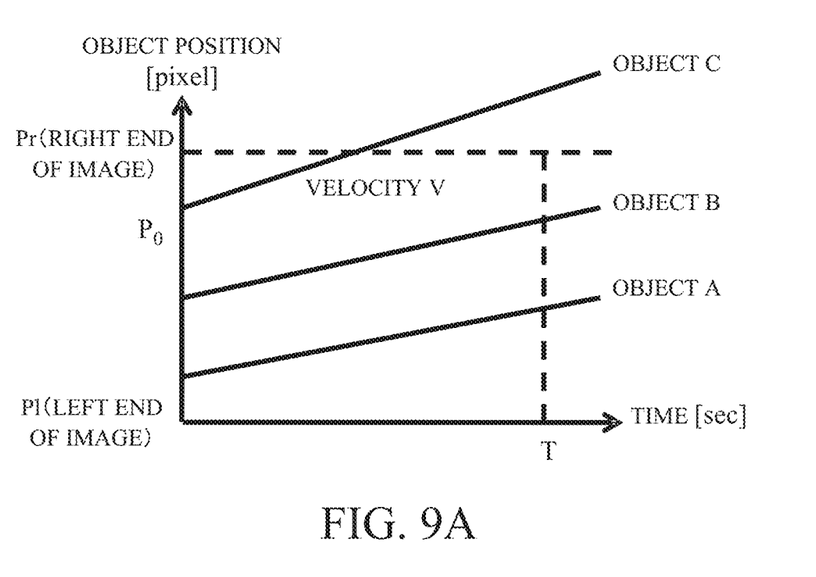
FIGS. 9A and 9B are views illustrating a determining method of a direction or a correction vector according to the first embodiment.

FIG. 9A illustrates a positional relationship between the elapsed time and the object areas A, B, and C in the captured images when the panning angular velocity is higher than the moving velocity of each object. Assume that Pr [pixel] is a position of the right end in the captured image, and P1 [Pixel] is a position of the left end in the captured image. Then, the plurality of objects A, B, and C approach to the right end Pr [pixel] in the captured image at moving velocity V [pixel/sec] as the time elapses.

Assume that T [sec] is start time of the last capturing in the one-time continuous capturing, and $P_0$ [pixel] is an initial position of the object C closest to the right end in the captured image. Then, the object is located outside the right end in the captured image before the last capturing is completed when the condition expressed by Expression (2) is satisfied.

Expression 2

$$V[\text{pixel/sec}] \times T[\text{sec}] + P_0 > Pr \qquad (2)$$

Therefore, the camera microcomputer 132 determines whether any one of the plurality of target object areas deviate from the right end in the captured image in the one-time continuous capturing by determining whether or not the condition of Expression (2) is satisfied. When the microcomputer 132 determines that any one of the objects (specific object areas) deviate from the right end in the captured image, the flow moves to S706. When the microcomputer 132 determines that none of the objects deviate from the right end in the captured image, the flow moves to S707.

In S706, the camera microcomputer 132 selects the object area C that contains the object C closest to the right end in the captured image that is more likely to be the main object for the user, as the first target object area that has a first priority in the follow shot assist continuous capturing processing.

On the other hand, in S707, the camera microcomputer 132 determines whether any one of the plurality of target object areas determined in S704 deviate from the right end in the captured image in the one-time continuous capturing.

Figure 9B:
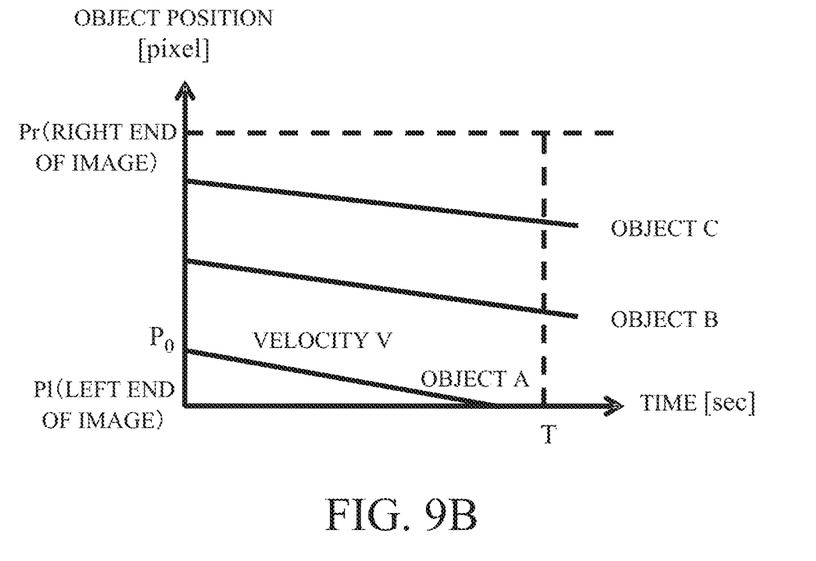

FIG. 9B illustrates a positional relationship between the elapsed time and the object areas A, B, and C in the captured images when the panning angular velocity is lower than the moving velocity of each object. The plurality of object areas A, B, and C approach to the left end P1 [pixel] in the captured image at moving speed. V [pixel/sec] as the time elapses.

Assume that T [sec] is start time of the last capturing in the one-time continuous capturing, and $P_0$ [pixel] is an initial position of the object A closest to the image left end. Then, the object A is located outside the left end in the captured image before the last capturing is completed when the condition expressed by Expression (3) is satisfied.

Expression 3

$$V[\text{pixel/sec}] \times T[\text{sec}] + P_0 < Pl \qquad (3)$$

Therefore, the camera microcomputer 132 determines whether any one of the plurality of target object areas deviate the left end in the captured image in the one-time continuous capturing by determining whether or not the condition of Expression (3) is satisfied. When the microcomputer 132 determines that any one of the objects (specific object areas) deviate from the left end in the captured image, the flow moves to S708. When the microcomputer 132 determines that none of the objects (specific object areas) deviate from the left end in the captured image, the flow moves to S709.

In S708, the camera microcomputer 132 selects the object area A containing the object A closest to the left end in the captured image that is more likely to be the main object for the user, as the first target object area that has a first priority, in the follow shot assisting continuous capturing processing.

In S709, similar to S206 in FIG. 2, the camera microcomputer 132 selects as the first target object area the target object area having the highest appearance frequency from among the histogram of the motion vector detected by the object areas A, B, and C prepared in S702.

The camera microcomputer 132 that has selected the first target object area in S706, S708 and S709 moves to S710.

In S710, similar to S207 in FIG. 2, the camera microcomputer 132 calculates a motion vector amount (target motion vector) to be corrected by the next step or the follow shot assist processing, from the histogram of the motion vector in the selected first target object area.

In S711, similar to S209 in FIG. 2, the camera microcomputer 132 provides the follow shot assist processing using the target motion vector amount of the first target object area.

Next, in S712, the camera microcomputer 132 determines whether the follow shot assisting is completed for all target object areas. When the camera microcomputer 132 determines that the follow shot assisting is completed for all target object areas, the camera microcomputer 132 moves to S713. Otherwise, the camera microcomputer 132 repeats S705 to S711, and provides follow shot assist processing for the newly selected first target object areas.

In S713, the camera microcomputer 132 determines whether or not the release switch is released by the user. If not, the camera microcomputer 132 repeats S705 to S711, and performs the follow shot assist processing for the first target object areas sequentially selected one each.

When the release switch is released in S713, the camera microcomputer 132 ends this processing.

As described above, this embodiment detects the positions and moving velocities of the plurality of extracted object areas in the continuous capturing using the follow shot assist processing. When the object area close to the end in the captured image is located outside the captured image before the one-time continuous capturing (a plurality of still image captures) is completed, the follow shot assist processing is performed for that object area that is close to the end. In other words, an order of the object area that is a target of the follow shot assist processing is set according to a vector amount or a position and moving velocity of the object area in the captured image. This embodiment prevents the captured image from dispensing with a prospective main object, and can properly and surely obtain a still image in which the main object has received an effect the follow shot assist function.

A set order of the object area that is a target of the follow shot assist processing according to the position and motion vector amount of the object area in the captured image can be used for a purpose other than the purpose of preventing the object near the end from deviating from the captured image.

The first and second embodiments discuss the follow shot assist processing without using the information of the angular velocity obtained from the angular velocity detector 111. However, a shift driving amount of the shift lens unit 104 may be calculated using the change of the angular velocity (or change of the panning velocity by the user) and the target motion vector amount.

While the above embodiments shift the shift lens 104 relative to the optical axis for the follow shot assisting function, the present invention may implement the follow shot assisting function by shifting the image sensor 122 as the optical element relative to the optical axis.

In each of the above embodiments, the camera microcomputer 132 in the camera 120 controls shift driving of the shift lens unit 104 in the interchangeable lens 100 using the extraction and detection result by the object extracting unit 142 and the motion vector detecting unit 141. However, the lens microcomputer 113 in the interchangeable lens 100 may serve as the optical element control unit, receive the extraction and detection result from the camera 120, and control shift driving of the shift lens unit 104.

Each embodiment provides shift driving for each capturing according to a shift drive amount calculated from each motion vector detected from the plurality of object areas. Thus, even when there are pluralities of objects containing the main object, each embodiment can obtain the still image of the main object for which the successful follow shot assist is performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-079234, filed Apr. 8, 2015, which is hereby incorporated by reference herein in its entirety.

What is claimed is:

1. A control apparatus configured to control an optical element configured to move in a direction different from an optical axis of an image pickup optical system in capturing an object that is moving, the control apparatus comprising:
a calculation unit configured to calculate a driving amount of the optical element from a motion vector detected in an object area that contains an image of the object in a motion image generated by capturing; and
a control unit configured to control the optical element according to the driving amount,
wherein the calculation unit calculates the driving amount for each of a plurality of motion vectors having different magnitudes detected in a plurality of object areas in the motion image,
wherein the control unit controls the optical element for each of the plurality of calculated driving amounts and for each capturing of a plurality of still images, and wherein at least one processor or circuit is configured to perform a function of at least one of the units.

2. The control apparatus according to claim 1, wherein the control unit controls the optical element according to the calculated driving amount in order of a motion vector having a higher appearance frequency among the motion vectors detected in the plurality of object areas.

3. The control apparatus according to claim 1, wherein the control unit controls the optical element according to the calculated driving amount in order of a motion vector of an object area having a closer to a focusing area in a captured image among the plurality of object areas.

4. The control apparatus according to claim 1, wherein the control unit sets an order of control of the optical element based on positions of the plurality of object areas and a magnitude of the motion vector detected in the plurality of object areas.

5. The control apparatus according to claim 4, wherein when the control unit determines, based on positions of the plurality of object areas and a magnitude of the motion vector detected in the plurality of object areas, that a specific object area among the plurality of object areas deviates from a captured image before the plurality of still image captures are completed, the control unit controls the optical element according to the driving amount calculated for the motion vector of the specific area.

6. An optical apparatus comprising:
a control apparatus configured to control an optical element configured to move in a direction different from an optical axis of an image pickup optical system in capturing an object that is moving, wherein the control apparatus comprises:
a calculation unit configured to calculate a driving amount of the optical element from a motion vector detected in an object area that contains an image of the object in a motion image generated by capturing; and
a control unit configured to control the optical element according to the driving amount,
wherein the calculation unit calculates the driving amount for each of a plurality of motion vectors having different magnitudes detected in a plurality of object areas in the motion image,
wherein the control unit controls the optical element for each of the plurality of calculated driving amounts and for each capturing of a plurality of still images,
wherein the optical apparatus further comprises at least one of the optical element, an image pickup unit configured to generate an image by capturing the object, and a detecting unit configured to detect the motion vector in the object area, and
wherein at least one processor or circuit is configured to perform a function of at least one of the units.

7. A non-transitory computer-readable storage medium for storing a computer program that enables a computer to control the optical element configured to move in a direction different from an optical axis of an image pickup optical system in capturing an object that is moving, to calculate a driving amount of the optical element from a motion vector detected in an object area that contains an image of the object in a motion image generated by capturing, and to control the optical element according to the driving amount,
wherein the computer program enables the computer to:
calculate the driving amount for each of a plurality of motion vectors having different magnitudes detected in a plurality of object areas in the motion image,
control the optical element for each of the plurality of calculated driving amounts and for each capturing of a plurality of still images.

8. A control method for controlling an optical element configured to move in a direction different from an optical axis of an image pickup optical system in capturing an object that is moving, the control method comprising the steps of:
calculating a driving amount of the optical element from a motion vector detected in an object area that contains an image of the object in a motion image generated by capturing; and
controlling the optical element according to the driving amount,
wherein the calculating step calculates the driving amount for each of a plurality of motion vectors having different magnitudes detected in a plurality of object areas in the motion image, and
wherein the controlling step controls the optical element for each of the plurality of calculated driving amounts and for each capturing of a plurality of still images.

* * * * *